United States Patent
Hartmann et al.

[11] 3,902,997
[45] Sept. 2, 1975

[54] METHOD OF ACCELERATING THE SEPARATION OF LIQUID DISPERSIONS

[75] Inventors: Rainer Hartmann; Otto Kunz, both of Frankfurt am Main, Germany

[73] Assignee: Metallgesellschaft Aktiengesellschaft, Frankfurt am Main, Germany

[22] Filed: Dec. 21, 1972

[21] Appl. No.: 317,444

[30] Foreign Application Priority Data
Dec. 24, 1971  Germany............................ 2164478

[52] U.S. Cl................................. 210/23; 210/314
[51] Int. Cl.².......................................... B01D 13/00
[58] Field of Search ....... 210/314, 23, 83, 456, 521, 210/522, 535, 299, 307, 317, 484, DIG. 5

[56] References Cited
UNITED STATES PATENTS

| | | | |
|---|---|---|---|
| 2,122,310 | 6/1938 | Burt............................... | 210/521 X |
| 2,609,099 | 9/1952 | Griswold......................... | 210/54 |
| 2,731,150 | 1/1956 | McCann........................... | 210/43 |
| 2,747,684 | 5/1956 | Lewis, Sr. et al............. | 210/DIG. 5 |
| 3,297,161 | 1/1967 | Kasten............................. | 210/114 |
| 3,385,439 | 5/1968 | Bach................................ | 210/522 X |
| 3,450,264 | 6/1969 | Graybill.......................... | 210/521 X |
| 3,645,398 | 2/1972 | Fiocco............................. | 210/73 |

*Primary Examiner*—Frank A. Spear, Jr.
*Attorney, Agent, or Firm*—Burgess, Dinklage & Sprung

[57] ABSTRACT

The separation of liquid dispersions in a gravitational field in accelerated by introducing the dispersion into a packed separating zone having two vertical layers, one behind the other in the direction of flow. The first layer of the packing is made of a material that is wetted by the dispersed phase and the second layer is made of a material that is wetted by the continuous phase of the dispersion.

7 Claims, 5 Drawing Figures

METHOD OF ACCELERATING THE SEPARATION OF LIQUID DISPERSIONS

BACKGROUND

This invention relates to a method of accelerating the separation of liquid dispersions consisting of two or more mutually insoluble or only partly soluble liquids into the separate liquid phases in a natural or artificial gravitational field in a process in which the dispersion to be separated is introduced into a separating vessel or settler which contains a packing and from which the separated phases are withdrawn, continuously or batchwise.

The invention relates also to apparatus for carrying out said method.

Such dispersion are produced to accelerate mass transfer processes between different liquids, for instance, in the separation of materials by liquid-liquid extraction. Such dispersions may also form in processes such as azeotropic and extractive distillation and in washing operations using acids and alkalies.

It is known in the art to separate these dispersions with the aid of phase separators, which comprise a vessel that is provided with an inlet for the dispersion to be separated and with outlets for the separated phases and in most cases contains internal fixtures which accelerate the separation of phases.

The following zones and regions can mainly be distinguished in a phase separator:

Inlet zone containing the dispersion to be separated;

Separation zone comprising regions which contain the separated light phase and the separated heavy phases, respectively;

a mixed-phases region containing the dispersion which has not yet been separated; and a withdrawal zone, in which the separated phases are withdrawn through outlets from the phase separator.

The individual zones are arranged one behind the other in the direction of flow of the dispersion to be separated. The regions containing the different phases are disposed one over the other in dependence on the different specific gravities of the phases.

The maximum throughput rate of a phase separator has been reached when the mixed-phases region extends as far as into the withdrawal zone close to the outlets for the separated phases.

The separating performance of such a phase separator or separating chamber is defined by the so-called throughput rate per unit of area in cubic meters of liquid to be separated per hour per square meter of the bottom surface area of the separating chamber.

The separating performance of phase separators can be increased by various measures.

It is known, for instance, to provide the phase separator with a mettalic packing, which fills the phase separator but does not substantially reduce the free cross-section thereof. Such packing consists of bodies which have sharp edges in a length of 10 – 25 centimeters per square centimeter of their surface area and which have in one direction a dimension which is at least three times any of their dimensions in the other directions (German Pat. No. 1,442,444).

SUMMARY

It is an object of the present invention to accelerate the separation of the dispersion of a plurality of liquids so as to enable an operation of separating vessels at high throughput rates per unit of area so that high throughput rates can be obtained with economical dimensions.

It has been found that the separation of a dispersion of a plurality of mutually insoluble or only partly soluble liquids in a gravitational field in a process in which the dispersion to be separated is introduced into a separating vessel which contains a packing and from which the separated phases are withdrawn can be accelerated in that the packing is divided into two vertical layers, disposed one behind the other in the direction of flow of the dispersion to be separated, the first layer consisting of a material which is preferentially wetted by the dispersed phase of the dispersion to be separated, and the second layer consisting of a material which is preferentially wetted by the continuous phase of the dispersion introduced into the separating vessel.

DESCRIPTION OF THE DRAWINGS

The invention will be diagrammatically explained more fully and by way of example with reference to the following drawings and Examples.

DESCRIPTION

Figure 1:
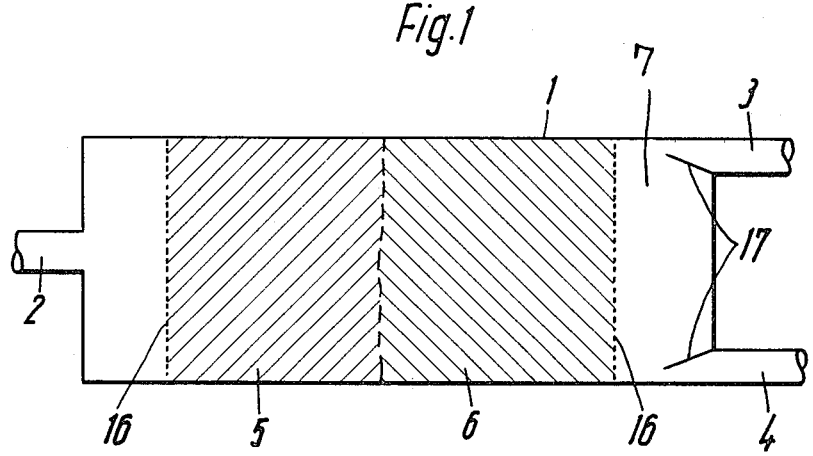
FIG. 1 is a diagrammatic vertical sectional view showing apparatus for carrying out the process according to the invention.
Figure 2:
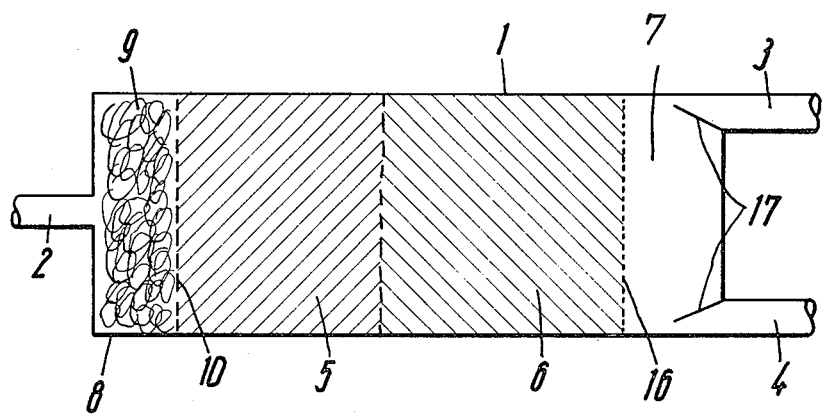
FIG. 2 shows a separating chamber comprising a distributor for the liquid dispersion to be separated.
Figure 3:
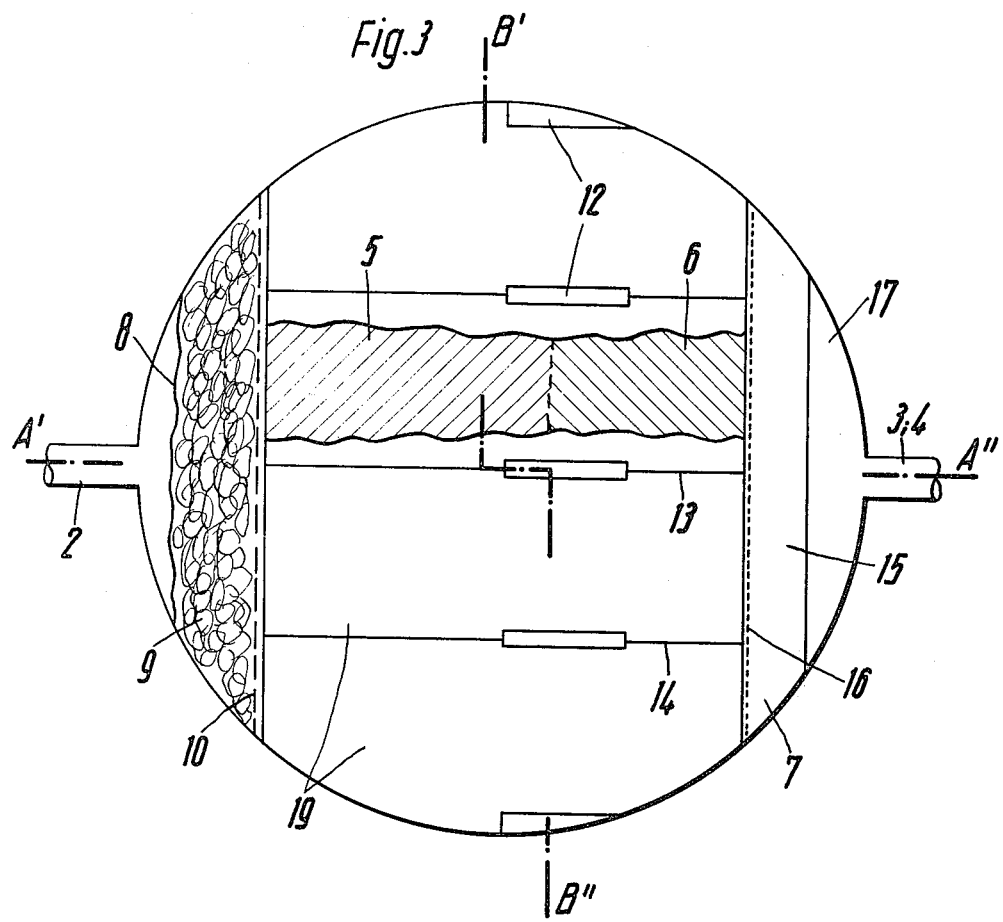
FIG. 3 is a diagrammatic horizontal sectional view showing a separating chamber having a circular bottom surface and containing zigzag-shaped plates dividing the packing into a plurality of horizontal layers.
Figure 4:
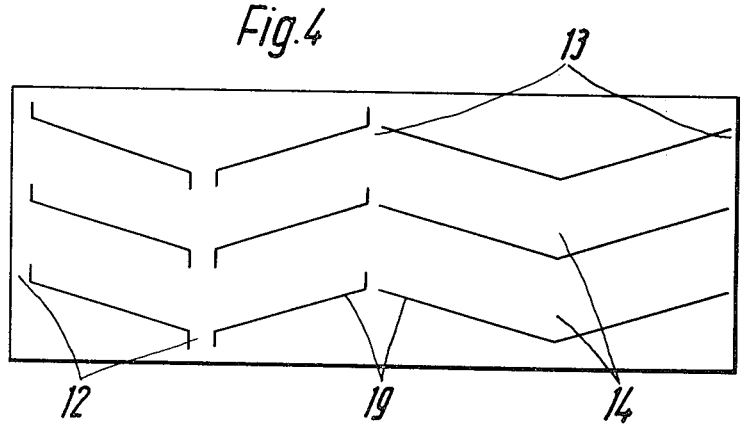
FIG. 4 is a sectional view taken on line B'—B' in FIG. 3.

It will be desirable to also fill the collecting zone 7 of the separating vessel with a packing consisting of a material which is preferentially wetted by the continuous phase of the dispersion introduced into the separating vessel.

The separation will be further accelerated if the packing is further divided by partitions into a plurality of horizontal layers which are parallel to the direction of flow of the dispersion to be separated.

For an improved and uniform distribution of the liquid dispersion to be separated throughout the receiving crosssection of the packing it has proved highly desirable to provide a distributor which precedes the separating zone.

The process may be carried out with apparatus which comprises a separating vessel 1 having an inlet 2 for the liquid dispersion to be separated and outlets 3 and 4 for the separated phases.

According to the invention, the separating vessel 1 of the apparatus comprises a packing of two different materials 5 and 6, which are disposed one behind the other in the direction of flow of the dispersion to be separated.

It will be of special advantage if the collecting zone 7 of the separating vessel contains a packing of a material which is preferentially wetted by the continuous phase of the dispersion introduced into the separating vessel.

It has been found particularly desirable to divide the packing into a plurality of layers which extend parallel to the direction of flow by partitions consisting of corrugated or zigzag-shaped plates 19 having crests 13 and valleys 14 which are, respectively, vertically aligned and which extend in the direction of flow of the liquid.

To facilitate the separation of the phases, outlets 12 for the separated phases are provided in the crests 13 and valleys 14 of the partitions 19.

It has been found to be particularly desirable to provide a distributor 8, which precedes the packing 5, 6 and consists of a packing 9 and a perforated plate 10, the packing 9 consisting of the same material as the packing 5.

The reference characters in the Figures designate the following parts:

A separating vessel 1, an inlet 2 for the liquid dispersion to be separated, an outlet 3 for the separated light phase, an outlet 4 for the separated heavy phase, a packing 5 of a material which is preferentially wetted by the dispersed phase, a packing 6 of a material which is preferentially wetted by the continuous phase of the dispersion introduced into the separating vessel, a collecting zone 7 for the separated phases, a distributor 8 for the liquid dispersion which has been introduced, a packing 9 of the distributor 8, a perforated plate 10 of the distributor 8, sheet metal plates 10 dividing the packings 5 and 6 into a plurality of layers, outlets 12 for the separated phases in zigzag-shaped sheet metal partitions, crests 13 in zigzag-shaped partitions, a packing 15 in the collecting zone 7, a wire screen 16 which confines and holds the packing 6 and weirs 17 preceding the outlets for the separated phases, a layer 18 of the packing, which is divided into several layers extending parallel to the direction of flow of the dispersion to be separated, and zigzag-shaped plates 19.

EXAMPLE 1

Figure 5:
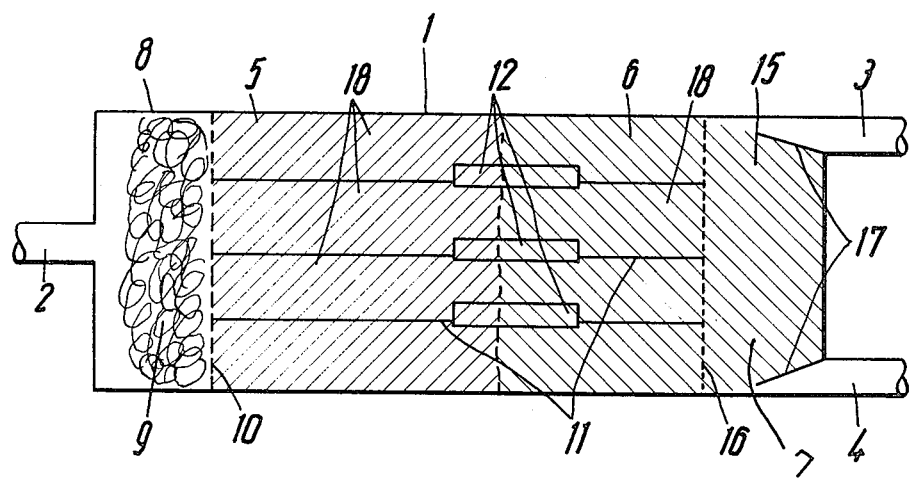
FIG. 5 is a sectional view taken on line A'—A' in FIG. 3.

To carry out the method, a mixture which has been dispersed in a mixer, not shown, is charged through an inlet 2 into a cylindrical separating vessel 1 (FIG. 5). 40 % by volume of the mixture consist of a solvent (N-methyl pyrrolidone containing 11 % by weight of water), which is saturated with hydrocarbons, and 60 % by volume consist of a solution of toluene and nonaromatic hydrocarbons. The mixture has a specific gravity of 0.811 kilograms per cubic decimeter.

The separating vessel 1 bis 200 centimeters in diameter and has a height of 80 centimeters.

The forward portion of the separating vessel 1 contains as a packing 5 in a depth of 55 centimeters a layer consisting of metallic turnings of Cr-Ni stainless steel, which is preferentially wetted by the heavy phase. The layer extends at right angles to the direction of flow of the dispersion, which is introduced at 2. The packing of chips has a bulk density of about 120 – 200 kilograms per cubic meter. The remaining packing 6 consists in a depth of 85 centimeters of a layer of irregular polypropylene fibers, which are about 0.2 – 1.5 millimeters in diameter and are arranged so that the axes of the fibers are preferably vertical and the volume of the fibers is not more than about 10 % of the free volume of the space filled by the fibers.

The packing 6 is confined and held in position by a wire screen 16.

The outlets 3 and 4 for the separated phases are preceded by weirs 17.

The liquid dispersion is introduced through the inlet 2 and by the distributor 8 containing wood wool packing 9 and a perforated plate 10 having holes which are 15 millimeters in diameter and have a spacing of 30 millimeters is uniformly distributed throughout the receiving cross-section of the package 5.

Flowing through the packing 5 and 6, the dispersion is separated into its two liquid phases, which are collected in the collecting zone 7 and are separately withdrawn through the outlets 3 and 4. The lighter hydrocarbon phase is withdrawn at 3 and the heavier solvent phase (N-methyl-pyrrolidone/water containing dissolved hydrocarbons) is withdrawn at 4.

With the arrangement described hereinbefore, the described mixture was processed in the separating chamber at a throughput rate of 23.6 cubic meters per square meter per hour.

In separating tests using the described test mixture in the above separating chamber containing a packing consisting only of metallic Cr-Ni steel turnings (i.e., with a packing which was not divided according to the invention into 2 layers of different material), a throughput rate of 13.8 cubic meters per square meter per hour could not be exceeded.

EXAMPLE 2

The test mixture described in Example 1 was processed in the same test vessel as in Example 1.

The packing 5 and 6 described in Example 1 is divided by three flat sheet metal partitions 11 into four horizontal layers 18, which are disposed one over the other and extend at right angles to the direction of the gravitational field.

In other respects, the internal configuration is the same as in Example 1.

With this arrangement a throughput rate of 38 cubic meters per square meter per hour was attained.

EXAMPLE 3

The mixture described in Example 1 was processed in the same separating vessel as in Example 1.

The separating vessel 1 contains the same packing 5 and 6 as in Example 1, which packing consists of two different materials. The packing is additionally divided into four vertically superimposed, horizontal layers 18 by three sheet metal partitions 19, which consist of zigzag-shaped plates which have crests 13 and valleys 14 that are, respectively, vertically aligned and extend in the direction of flow of the liquid and have outlets 12 for the separated phases.

The zigzag-shaped plates have an single of inclination of 10°. The horizontal spacing between the crests 13 and the valleys 14 is 50 centimeters. The outlets 12 are shaftlike and have a width of 2 centimeters, a height of 3.7 centimeters, and a length of 40 centimeters and are spaced 40 centimeters apart from the perforated sheet metal element 10.

The distributor 8 consists of a packing 9 having a thickness of 10 centimeters and consisting of stainless steel turnings, and a perforated sheet metal element 10 having bores which are 15 millimeters in diameter and spaced 30 millimeters apart.

With this arrangement, the separating chamber can be operated at a throughput rate of 42 cubic meters per square meter per hour.

EXAMPLE 4

The same test mixture as in Example 3 is processed in the arrangement described in Example 3. In addition, the collectin zone 7 is filled with the polypropylene fibers which form also the packing 6.

With this arragenement, the separating chamber can be operated at a throughput rate of 50 cubic meters per square meter per hour.

It is an essential advantage afforded by the invention that the separation of liquid dispersions is substantially accelerated with simple means so that separating chambers can be built which are much smaller and for this reason less expensive. The smaller volume of the separating chamber involves a smaller volume of solvent and of the material to be processed so that the capital requirements are much reduced in the case of expensive products because a smaller initial charge is sufficient.

Existing separating chambers can be operated at a higher capacity if the packing is divided according to the invention into layers disposed one behind the other. This will eliminate the need to install an expensive additional separating chamber or a correspondingly larger, new separating chamber.

We claim:

1. Method for accelerating the separation of liquid dispersions of aqueous N-methyl pyrrolidone in a hydrocarbon mixture into the separate liquid phases in a natural or artificial gravitational field which comprises introducing the dispersion to be separated into a packed separating zone having layers of different packing materials disposed one behind the other in the direction of flow of the dispersion to be separated, the first layer being stainless steel turnings which are preferentially wetted by the dispersed phase of the dispersion to be separated, and the second layer being polypropylene fibers which are preferentially wetted by the continuous phase of the dispersion to be separated, feeding the separated phases into a collecting zone which follows said separating zone and which is filled with a packing material which is preferentially wetted by said continuous phase, and thereafter withdrawing the separated phases from said collecting zone.

2. Method of claim 1 wherein the layers of packing material are further divided by partitions into a plurality of layers parallel to the direction of flow of the dispersion.

3. Method of claim 1 wherein a distribution zone precedes said separating zone to provide for an improved and uniform distribution of the liquid dispersion to be separated throughout the packing material layers.

4. Method of claim 1 wherein the packing material in said collecting zone is polypropylene fibers.

5. Apparatus for accelerating the separation of liquid dispersions comprising a separating vessel having an inlet for the liquid dispersion to be separated, outlets for the separated phases, packing means divided into layer of two different packing materials disposed one behind the other in said vessel in the direction of flow, the first layer being preferentially wetted by the dispersed phase of said dispersion and the second layer being preferentially wetted by the continuous phase of said dispersion, said packing means being further divided into a plurality of layers which extend parallel to the direction of flow by partition means of corrugated or zigzag-shaped plates having crests and valleys, said plates being vertically aligned and extending in the direction of flow, and collecting means in said separating vessel following said packing means and containing a packing material which is preferentially wetted by said continuous phase.

6. Apparatus of claim 5 wherein said plates have outlets for the separated phases in their crests and valleys.

7. Apparatus of claim 5 wherein distribution means are included preceding the packing means and contains a packing and perforated plate, said packing being of the same material as the first layer of said packing means.

* * * * *